United States Patent [19]

Boxma

[11] Patent Number: 5,721,623
[45] Date of Patent: Feb. 24, 1998

[54] METHOD AND DEVICE FOR ADJUSTING A HARD-COPY-UNIT

[75] Inventor: Hendrik Boxma, Enschede, Netherlands

[73] Assignee: U.S. Philips Corporation, New York, N.Y.

[21] Appl. No.: 435,058

[22] Filed: May 8, 1995

[30] Foreign Application Priority Data

May 6, 1994 [FR] France .................. 94 201260

[51] Int. Cl.$^6$ .................................................. H04N 1/40
[52] U.S. Cl. .................. 358/448; 358/406; 358/475; 358/504; 382/167
[58] Field of Search ............................ 358/448, 527, 358/504, 518, 531, 406, 501, 505, 506, 520, 519, 537, 475; 382/167, 162; 348/673, 687

[56] References Cited

U.S. PATENT DOCUMENTS

| | | | |
|---|---|---|---|
| 4,002,914 | 1/1977 | Macousici | 250/461 R |
| 4,091,419 | 5/1978 | Rhee et al. | 348/673 |
| 4,679,087 | 7/1987 | Torrano, Jr. et al. | 348/673 |
| 4,682,231 | 7/1987 | Yamakawa | 348/673 |
| 4,700,058 | 10/1987 | Belanger et al. | 250/205 |
| 4,710,785 | 12/1987 | Mills | 346/153.1 |
| 4,730,214 | 3/1988 | Lambert et al. | 358/139 |
| 4,739,375 | 4/1988 | Kuzyk et al. | 355/69 |
| 4,757,334 | 7/1988 | Volent | 354/76 |
| 4,878,111 | 10/1989 | Meyer | 358/506 |
| 4,939,581 | 7/1990 | Shalit | 358/244 |
| 5,285,297 | 2/1994 | Rose et al. | 358/518 |
| 5,328,787 | 7/1994 | Clifford et al. | 430/30 |
| 5,333,069 | 7/1994 | Spence | 358/517 |
| 5,345,315 | 9/1994 | Shalit | 358/406 |
| 5,369,499 | 11/1994 | Yip | 358/406 |
| 5,510,896 | 4/1996 | Wafler | 358/296 |
| 5,546,165 | 8/1996 | Rushing et al. | 355/208 |
| 5,585,841 | 12/1996 | Hardin | 348/163 |

FOREIGN PATENT DOCUMENTS 0196851  10/1986  European Pat. Off. .
0395216  10/1990  European Pat. Off. .

Primary Examiner—Edward L. Coles, Sr.
Assistant Examiner—Madeleine Au Nguyen
Attorney, Agent, or Firm—Jack D. Slobod

[57] ABSTRACT

A hard-copy-unit (HCU) or camera for recording medical images on film needs regular calibration to compensate for differences in film and film processing. This can be done by making a hard copy (HC) with a number of predetermined grey values and measuring the resulting optical densities on the hard copy. From the resulting optical density values new brightness (B) and contrast (C) parameters are determined that will result in the correct maximum and minimum optical densities of subsequently exposed and processed images on film.

6 Claims, 1 Drawing Sheet

METHOD AND DEVICE FOR ADJUSTING A HARD-COPY-UNIT

BACKGROUND OF THE INVENTION

1. Field of Invention

The invention relates to a method for adjusting a hard-copy-unit for electronically picked-up, processed or recorded images. The invention also relates to a system for making hard copies which system is suitable for being calibrated according said method.

2. Description of the Related Art

Medical diagnostic images are often recorded by electronic means, for example an X-ray device having a TV-camera for pick-up of images at the output side of an image intensifier. In other modalities, for example X-ray computed tomography (CT) or magnetic resonance imaging (MRI) images are generated by a computer reconstruction from acquired data. The electronically recorded or generated images are normally processed in a so-called image processor to enhance or optimize certain image characteristics. In the clinical practice it is often required to obtain hard copies of the images, for example on a transparent film. The procedure to obtain such hard copies is diagrammatically illustrated in FIG. 1. A hard copy is produced using a hard-copy-unit (HCU).

In a HCU a cathode-ray-tube (CRT) or other image source, such as a modulated scanning laser beam, is used to create an image on a photographic film, which film is then developed, for example in a so-called film processor. The quality of the resulting hard copy, in particular its contrast and brightness of the darkest and brightest areas in the image depends on such parameters as the characteristics of the film used, which characteristics vary between film types and even different production batches of the same film type, the temperature and composition of the chemical development baths and the processing time therein. The total combination of these parameters may and will cause deviations from the desired values.

Due to such deviations the hard copy becomes of limited clinical value and the system has to be readjusted. The conventional manner of adjustment is a cumbersome method which takes about an hour's work by a qualified technician, in which period he has to make, process and inspect several sets of images.

A method for calibration of a system for photographing a video image is known from U.S. Pat. No. 4,939,581. The known method provides for a calibration in which the density variation of a electronic camera or hard-copy-unit matches that of a monitor on which the same image is displayed. This is achieved by making a hard copy of a predetermined test pattern and measuring each of the densities in the test pattern and comparing them in a computer with the ideal luminance values. Then a compensation value is provided for each grey-value to compensate for the distortions from the reproduction process. Compensation is provided by means of a look-up table such that each grey-value input is first changed to a value that will create on the hard copy the desired density. This method needs a pre-calibration and/or an allowance of a certain spare range at both sides of the density range in order to ensure that the maximum and minimum densities in the test pattern can be reached on the hard copy. This leads to a limitation of the available density range, i.e. a reduction of the available resolution. In the U.S. Pat. No. 4,939,581 for this purpose a reduction of 20% of the available density range is suggested, which is considerable.

SUMMARY OF THE INVENTION

It is, inter alia, an object of the present invention to achieve a calibration by means of adjusting the brightness and contrast parameters of the hard-copy-unit, thereby avoiding the use of electronically changing the input values and the reduction of the available density range and the need of a pre-calibration.

According to the invention a method is provided for a) making a hard-copy with the hard-copy-unit to be adjusted of at least one reference image comprising predetermined grey-values;

b) measuring the optical density of the grey-values as reproduced on said hard-copy;

c) determining from said measured grey-values the desired brightness and contrast parameters for the hard-copy-unit, said desired brightness and contrast parameters determining the minimum and maximum optical densities in the hard-copy; and d) setting the brightness and contrast parameters of the hard-copy-unit to the desired values.

From the comparison of the measured predetermined grey-values and the grey-value as they should be according to the reference image, a change in brightness and contrast settings of the HCU can be determined with an algorithm that can be performed with a computer, for example a microprocessor integrated in the HCU. After determining the required changes the operator can adjust the settings of the HCU or this adjustment can be done automatically via a data link between the computer and the HCU. It is remarked that, although most of the problems of deterioration of image quality is caused by differences in photographic film or in the development process, the inventive method has the advantage that the HCU is easily adjustable and allows for a quick and accurate adjustment.

A significant advantage of the present invention in the clinical environment is that, due to the rapid adjustment procedure, the image quality can be assured much better. So, a diagnosis will not be hampered by inferior image quality. A further advantage of the present invention is that the method can be performed in short time by personnel that is untrained in this respect, for example hospital staff.

BRIEF DESCRIPTION OF THE DRAWING

These and other aspects of the invention will now be described in further detail with reference to the drawing, wherein.

DETAILED DESCRIPTION OF THE PREFERRED EMBODIMENTS

Figure 1:
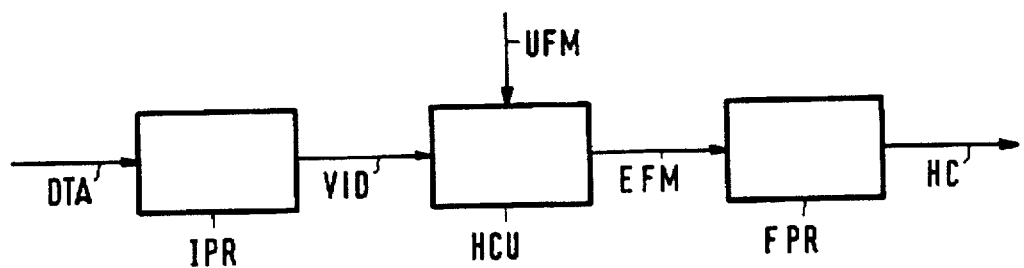
FIG. 1 shows diagrammatically the principle of making hard-copies.

In FIG. 1 image data DTA, for example acquired by an X-ray device with an image-intensifier-TV chain, a CT or MRI scanner, are first processed by an image processor IPR. The image processor has an output on which an electronic signal VID representing the processed image is available. The electronic signal VID is applied to a HCU, for example of the type Philips PMI-11, in which unexposed film UFM is placed. In the HCU the film is exposed to said image, for example by making an optical image of a CRT on the film by means of an optical lens system, or with a modulated scanning laser beam. The exposed film EFM is then transported to the film processor FPR, for example of the type Agfa-Curix, and developed. After development and drying the hard-copy is ready for inspection, for example by a radiologist.

The quality of the hard-copy can be qualified in terms of optical density (OD), which is defined as the logarithm of the reciprocal transparency: $OD = \log_{10} T^{-1} = \log_{10}(I_0/I)$, where $I_0$ is the intensity of the incident light beam and I the intensity of the light passing through the film. A bright area on film has a low OD, a dark area a high OD.

If two films have been exposed with the same image a difference in density exists if the optical densities of both images are different. The admitted variation of optical density at certain exposure levels is put down in norms, for example the mostly used IEC-norm 62B.

A first parameter determining for the density is the film itself, which is very important for the image quality. Every type of film has its own characteristics. Within a type films are produced in different batches. Films from the same production batch can be said to have the same characteristics, because the casting process of the emulsion is extremely accurate. However, difference between film batches can occur. A further effect is due to possible variations in storage and transport of the film. Such faults can arise due to wrong temperature and/or humidity; radiation of light or X-rays; or chemical influences. Storage and transportation faults affect the film is such a way that the so-called fog-level increases. In literature, specifications about distribution and storage have been described.

Figure 2:
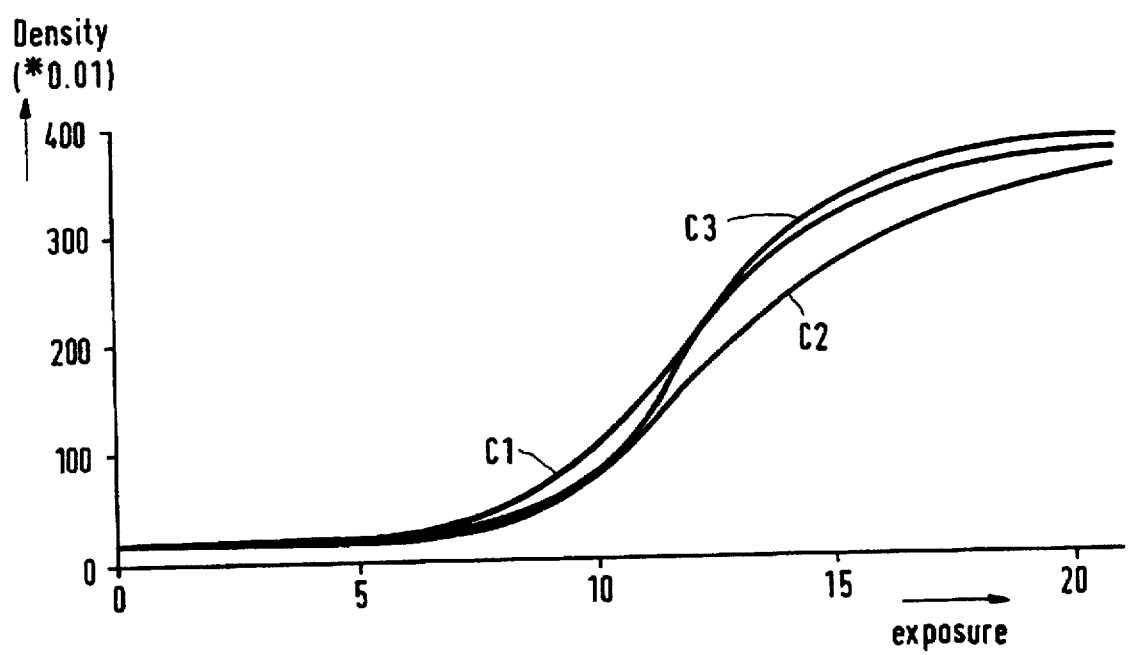
FIG. 2 is a graph of several curves of optical density versus exposure for different quality of the chemical baths.

However, the most common source of density variation is a change in the processing environment (developer temperature, developer depletion and contamination of the developer solution with fixer). There are many factors which influence the image quality in this way, the most important will be discussed briefly. When the chemicals in a film processor bath exhaust, the maximum optical density ($OD_{max}$) decreases with time. In FIG. 2 the effect is illustrated. Curve C1 shows the optical density as a function of exposure for an initial sample taken on 20 Oct. 1993. In a sample taken on 8 Nov. 1993 the influence of exhaustion is visible (curve C2); the gradient is more gradual and the maximum optical density that can be achieved has decreased. After a fresh bath was introduced on 11 November 1993 the gradient and maximum optical density have increased. Optical density varies with time and the same image, with the same settings, may have different optical densities. The baths not only degrade in time due to exhaustion, but chemicals of different quality may be used as well, equally resulting in images of different quality.

The influence of temperature of and time in the bath is significant. A higher temperature and longer reaction time increase the optical density. Also wear, maintenance and type of film-processor can influence the optical density as a function of (a longer) time.

To correct for the deterioration of the image quality a periodic re-adjustment of the exposure parameters is performed. Adjustment of exposure parameters has the advantages that all kinds of disturbances can be compensated as the procedure is based on a calibration of the imaging system. Such a procedure can be almost completely realized in software. Especially the adjustment of exposure parameters is already realized in a HCU, this means that such a solution is cheap. As the procedure can be realized in software, a re-adjustment procedure is possible that requires only simple tasks from the operator. As a further advantage can be mentioned that, if the quality of images can be kept constant by adjusting new exposure parameters instead of often changing chemicals, less chemical waste will result which is environmentally beneficial.

An automatic brightness control loop in the HCU provides the possibility to set the minimum and maximum optical densities ($OD_{min}$ and $OD_{max}$). In normal operation, the brightness (B) and contrast (C) parameters determine the maximum and minimum optical densities, respectively. A problem is that the effect of the B/C-settings with respect to the density curve, i.e. the curve relating density to exposure, is unknown. This problem can be easily solved by introducing a look-up table (LUT) which is calculated after the HCU/film-processor has been calibrated. Such a LUT can be implemented in the HCU itself. Now two possible implementations of the adjustment procedure will be discussed. The first embodiment is based on automation of the method as used by a qualified service engineer. It is first assumed that the HCU/film-processor system has been optimally installed by a service engineer, setting the brightness and contrast parameters as $B = B_{org}$ and $C = C_{org}$. The algorithm stored in a computer then performs the following two steps.

1. The correct brightness setting ($B_{new}$) is obtained automatically:

1.1 Set contrast (C) to zero.
 1.2 Expose the film for different brightness values, around the present setting of $B_{org}$.
 1.3 Develop the film and measure the optical densities.
 1.4 Interpolate the different measured optical densities and obtain therefrom a new setting for B. In this procedure it is assumed that the absolute difference between $B_{org}$ and the new value for B ($B_{new}$) is less than $\Delta$ ($|B_{org} - B_{new}| < \Delta$) and that the interpolation will provide good results if the difference between two successive steps of B is not more than $\delta$. The minimum number of different values for B can then be calculated from: $n = 1 + 2\Gamma(\Delta/\delta)$. For example, if it can be assumed that $\Delta = 35$ units and $\delta$ is set at $\delta = 10$ units, the number of images necessary for a proper determination of $B_{new}$ will be $1 + 2\Gamma(35/10) = 9$. The different brightness values B in step 1.2 can be distributed at both sides of $B_{org}$. If it is known beforehand that $B_{org}$ is too low or too high, setting B-values at only one side of $B_{org}$ is possible.

Determination of the contrast parameter (C). In this step the possibility to measure the intensity of the image source in the HCU is used to adjust the contrast setting.

2.1 Determine (by a different procedure) the intensity ($I_{target}$) of the image source in the HCU at which the minimum optical density on film should be obtained.
 2.2 Set the brightness value at the result of step 1.
 2.3 Set the video input signal at maximum, i.e. the value at which the film should have minimum optical density.
 2.4 Seek, for example by a binary search, the setting of C that provides the required intensity $I_{target}$.

It has to be realized that photographic film inverts black and white, so the image source is operated in positive mode, i.e. a zero input signal will provide a bright light output of the image source. If the image source is calibrated continuously by means of an intensity sensor (photocell) in a feed-back loop, the output of this sensor can be used in the binary search procedure of step 2.4.

Compared to the conventional method, in this method brightness and contrast can be adjusted by one set of film exposures. The operator has to process films only once instead of at least twice in the conventional procedure. A further advantage is that only a minimal hardware modification has to be performed, namely the possibility to extract the output of the intensity sensor.

In the second embodiment of the adjustment procedure, also first the brightness is corrected, followed by correction of the contrast. In this embodiment a test pattern is used as video input signal of the HCU. The test pattern comprises a number of equal steps, for example 16, between 0% and 100% in the input signal. Brightness and contrast are set at such large values above the expected corrected values that the density curve, as generated by the test pattern on the film, will overlap with both $OD_{min}$ and $OD_{max}$. $OD_{min}$ and $OD_{max}$ are standardized at 0.21 and 3, respectively. The optical density at each of the steps is measured and a number of points, giving input voltage as a function of optical density, is determined. The input voltages ($V_{ODmin}$ and $V_{ODmax}$) in the input signal for these two optical densities can now be found by interpolation from the curve. For the interpolation a cubic spline algorithm has been found suitable.

The next step is to provide constant-level inputs, having $V_{in}=V_{ODmin}$ and $V_{in}=V_{ODmax}$, respectively. The corresponding screen intensities are $I_{ODmin}$ and $I_{ODmax}$ and are, for example, determined by a digital voltmeter connected to the light sensor in the HCU. The maximum screen intensity determines the maximum optical density. Brightness can now be adjusted by setting C equal to zero and varying brightness until the screen intensity equals $I_{ODmax}$. Subsequently, contrast is adjusted by providing a 100% video signal input and varying contrast till the screen intensity is $I_{ODmin}$. To be able to implement this method, the measured screen intensity has to be convened to a digital value to be inputted to the computer, for example, also by means of a digital voltmeter.

After obtaining brightness and contrast values with the above procedure, of a set of nine test images (GrayBar, 16 steps) has been made on one film. Minimum and maximum densities have been measured, the results are summarized in the following table:

| Image number | $OD_{min}$ (100%) | $OD_{max}$ (0%) |
|---|---|---|
| 1 | 0.21 | 2.89 |
| 2 | 0.21 | 2.90 |
| 3 | 0.21 | 2.90 |
| 4 | 0.23 | 2.92 |
| 5 | 0.22 | 2.94 |
| 6 | 0.20 | 2.91 |
| 7 | 0.22 | 2.91 |
| 8 | 0.22 | 2.96 |
| 19 | 0.20 | 2.90 |

These results fully comply with the norm IEC 62B.

For the operator the procedure of adjustment will be as follows: After initiating the procedure, for example by activating a CAL-button, the HCU produces an internally generated test pattern and exposes a film therewith. Then the user develops the film and enters it in a densitometer that measures the optical density for each of a number of predetermined areas on the test film. These values are then sent to the computer in the HCU. If the computer determines that $OD_{min}$ and/or $OD_{max}$ are outside predetermined limits a new test pattern is to be generated with other settings of B and C. Otherwise, the interpolation procedure is performed and new values for B and C are determined and entered in the HCU.

Both pattern generator and computer can be incorporated in the HCU. This has the advantage that no modifications have to be performed in other parts of the image-processor/hard-copy chain and that installation is easy. In an alternative embodiment the video generator of the image-processor is used to generate the test pattern. In this case no separate video generator is necessary in the HCU, with removes a possible cause of error due to mismatches between two video generators. It is also very user-friendly as the operator can perform the adjustment from the operator console of the X-ray device or the like.

In a third embodiment a separate adjustment unit is inserted in between the image processor and the HCU. This CAL-box will comprise a start button, a display, an AD-convertor for converting the light sensor output of the HCU to a digital representation, a video generator for generating the test patters and a computer or microprocessor for the necessary calculations and control. The interfaces between CAL-box, image processor and HCU will be: Video-in from the image processor system, Video-out to the HCU, Data-in (for example via an RS232-interface) from the image processor, Data-out to the HCU and AD-in from the light sensor of the HCU. In normal operation, Video-in and Video-out will be connected as well as Data-in and Data-out. During the adjustment procedure the CAL-box will steer the HCU. Preferably the CAL-box will also contain an input from a densitometer, or have a densitometer integrated with it. This third embodiment has the advantage that no modifications to the image processor or the HCU are required.

The adjustment procedure determines new brightness and contrast parameters of the HCU such that 0% and 100% video input signal will result in $OD_{max}$ and $OD_{min}$ on the photographic film, respectively. The optical densities from other video levels cannot be changed independently by the adjustment algorithm. If necessary, this problem can be solved by using a look-up table (LUT) in the image processor or incorporating a LUT in the HCU. If it is necessary to calculate a LUT to adjust densities values in between the extremes $OD_{max}$ and $OD_{min}$ the procedure for the LUT and for $OD_{max}$ and $OD_{min}$ should be integrated. After exposure and processing of a film for obtaining the new B/C values, a new film can be exposed with a further test pattern. The densities on this film can then be used for determining the LUT. Simultaneously, this latter film can be used to check if the adjustment of the B/C values was successful. Optionally, the adjustment procedure can be provided with a warning if the chemicals in the film processor seem to be wrong. Such check can be added both to the procedure for B/C adjustment and for determination of the LUT. In the adjustment procedure a warning can be given if $OD_{min}$ or $OD_{max}$ cannot be reached. Determination of the LUT may provide a warning if the curve from $OD_{max}$ to $OD_{min}$ cannot be adjusted to the desired perception curve.

I claim:

1. A method for adjusting individually settable contrast and brightness parameters of a hard copy unit for electronically picked up, stored or generated images, the method comprising:
   a) making a hard copy with the hard copy unit to be adjusted of at least one reference image comprising predetermined grey-values;
   b) measuring optical density values as reproduced on said hard copy in response to said predetermined grey-values;
   c) determining from said measured optical density values desired values of the brightness and contrast parameters for the hard copy unit, said desired values of the brightness and contrast parameters together fixing minimum and maximum optical densities in hard copies to be made by the hard copy unit; and
   d) setting the brightness and contrast parameters of the hard copy unit to the determined desired values.

2. A method as claimed in claim 1, wherein the desired values of the brightness and contrast parameters for the hard copy unit are determined from said measured optical density values by first determining the desired value of the brightness parameter from optical density values measured from a hard copy made with the contrast parameter of the hard copy unit set to zero and then determining the desired value of the contrast parameter from optical density values measured from a hard copy made with the brightness parameter of the hard copy unit set to the determined desired value.

3. A device for calibrating a hard copy unit for electronically picked up, stored or generated images by determining individually settable brightness and contrast of the hard copy unit in a calibration procedure, the device comprising:

(a) a pattern generator for generating a video signal to be inputted to the hard copy unit;

(b) a first input connected to an intensity sensor of the hard copy unit;

(c) a second input for receiving optical density values of a hard copy made by the hard copy unit in response to said video signal from said pattern generator; and (d) a control computer for control of the calibration procedure and for calculation of desired values of the brightness and contrast parameters for the hard copy unit from the received optical density values, said desired values of the brightness and contrast parameters together fixing minimum and maximum optical densities in hard copies to be made by the hard copy unit.

4. A device as claimed in claim 3, which is integrated with a hard copy.

5. A device as claimed in claim 2, wherein the desired values of the brightness and contrast parameters for the hard copy unit are calculated from the received optical density values, by first calculating the desired value of the brightness parameter from received optical density values of a hard copy made with the contrast parameter of the hard copy unit set to zero and then calculating the desired value of the contrast parameter from received optical density values of a hard copy made with the brightness parameter of the hard copy unit set to the calculated desired value.

6. A device as claimed in claim 5, which is integrated with a hard copy unit.

* * * * *